3,751,463
CYCLOPENTANE DERIVATIVES
Michael Peter Lear Caton, Upminster, Trevor Parker, Romford, and Gordon Leonard Watkins, Dagenham, England, assignors to May & Baker Limited, Dagenham, England
No Drawing. Filed May 26, 1971, Ser. No. 147,273
Claims priority, application Great Britain, May 27, 1970, 25,486/70
Int. Cl. C07c *103/86*
U.S. Cl. 260—557 R    4 Claims

ABSTRACT OF THE DISCLOSURE

Compounds of the formula:

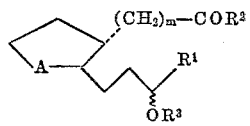

wherein A represents carbonyl or a group —CH(OR$^3$)—, R$^1$ represents alkyl, cycloalkyl or cycloalkyl-alkyl, $m$ represents 4 or 6, R$^2$ represents hydroxy, alkoxy, amino, monoalkylamino, dialkylamino or, except when A represents carbonyl, hydrazino optionally substituted by one or two alkyl groups, and R$^3$ represents hydrogen, alkyl, or when R$^2$ represents hydroxy or alkoxy, an alkanoyl group, and when A represents a group —CH(OR$^3$)— the symbols R$^3$ both represent hydrogen atoms or identical groups, possess pharmacodynamic properties, in particular hypotensive activity and reduction in gastric acid secreation.

---

This invention relates to new cyclopentane derivatives, processes for their preparation, and compositions containing them.

According to the present invention there are provided the new cyclopentane derivatives of the general formula:

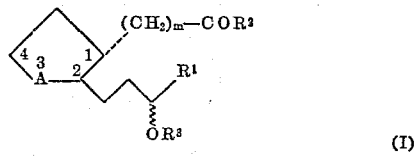

(I)

(wherein A represents a carbonyl group or a group of the general formula:

$$-CH(OR^3)-$$    (II)

R$^1$ represents an alkyl group containing from 1 to 10 (preferably 5) carbon atoms, a cycloalkyl group, or an alkyl group substituted by a cycloalkyl group, $m$ represents 4 or 6, R$^2$ represents a hydroxy group or a group of the general Formula III, IV or, except where A represents a carbonyl group, V:

(III)    (IV)    (V)

wherein R$^4$ represents an alkyl group, R$^5$, R$^6$, R$^7$ and R$^8$ each represent a hydrogen atom or an alkyl group, and R$^3$ represents a hydrogen atom, an alkyl group or, except where R$^2$ represents a group of Formula IV or V, a group of the general formula:

$$-CO-R^9$$    (VI)

wherein R$^9$ represents an alkyl group; when A represents a group of Formula II the symbols R$^3$ represent identical groups) and, when R$^2$ represents a hydroxy group, non-toxic salts thereof. In this specification it is to be understood that, unless otherwise specified, alkyl groups contain from 1 to 4 carbon atoms and cycloalkyl groups contain from 3 to 10 carbon atoms.

The compounds of general Formula I and their non-toxic salts possess valuable pharmacodynamic properties, in particular hypotensive activity and reduction in gastric acid secretion. For example, in laboratory screening methods the compounds produce a 10 mm. Hg fall in the mean blood pressure of the urethanaesthetized, pempidine-treated rat at doses between 0.1 and 3.0 mg./kg. animal body weight administered intravenously, while doses between 0.05 and 2.0 mg./kg. animal body weight administered orally produce a 50% reduction in the gastric acid secretion induced in the rat by continuous intravenous infusion of pentagastrin.

According to a feature of the present invention, the compounds of general Formula I, wherein R$^2$ represents a hydroxy group and R$^3$ represents a hydrogen atom or an alkyl group, are prepared by the alkaline hydrolysis of compounds of Formula I wherein R$^2$ represents a group of Formula III. Hydrolysis is preferably effected by treatment with an alkali metal hydroxide, e.g. sodium hydroxide, in an aqueous-organic solvent, e.g. aqueous ethanol, if desired at an elevated temperature, for example 40°–110° C., e.g. the reflux temperature of the reaction mixture.

Compounds of general Formula I, wherein A represents a group of Formula II, R$^2$ represents a group of Formula III and the symbols R$^3$ represent hydrogen atoms, are prepared by the acid hydrolysis of compounds of the general formula:

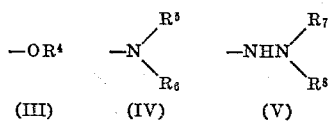

(VII)

wherein R$^1$, R$^4$ and $m$ are as hereinbefore defined, and R$^{10}$ represents a 2-tetrahydropyranyl group unsubstituted or substituted by, for example, at least one alkyl group. Hydrolysis is preferably effected by treatment with an aqueous inorganic acid, e.g. dilute hydrochloric acid, preferably in the presence of an inert organic solvent, for example a lower alkanol, e.g. ethanol, at laboratory temperature or elevated temperature, e.g. 50–60° C., and more particularly in the presence of a cation exchange resin, e.g. Dowex AG50W-X8 H$^+$ resin.

Compounds of General Formula VII may be prepared by the reduction of compounds of the general formula:

(VIII)

wherein R$^1$, R$^4$ and R$^{10}$ are as hereinbefore defined, and $n$ represents 1 or 2. Reduction is preferably effected by hydrogenation in the presence of a hydrogenation catalyst, for example palladium on charcoal, in the presence of an inert organic solvent, for example a lower alkanol, e.g. ethanol, at laboratory temperature and elevated pressure e.g. at a hydrogen pressure of 15 kilograms per square centimetre.

Compounds of general Formula VIII may be prepared by the reaction of compounds of the general formula:

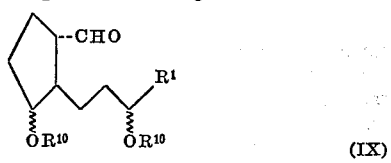

(IX)

(wherein R¹ and R¹⁰ are as hereinbefore defined) with compounds of the general formula:

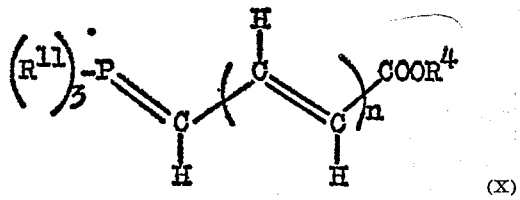

(X)

wherein R⁴ and n are as hereinbefore defined, and R¹¹ represents an alkyl group or a phenyl group unsubstituted or substituted by an alkyl group and advantageously represents a phenyl or n-butyl group. Reaction is preferably effected in the presence of an inert organic solvent, for example a halogenated hydrocarbon, e.g. chloroform, at temperatures between 0° C. and 30° C. under an inert atmosphere, e.g. nitrogen.

Compounds of general Formula X may be prepared by the treatment of compounds of the general formula:

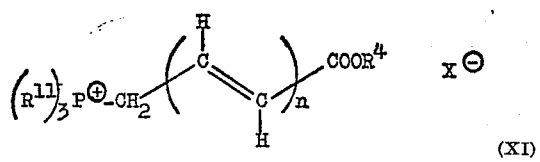

(XI)

(wherein R⁴, R¹¹ and n are as hereinbefore defined, and X represents a bromine or chlorine atom) with an inorganic base, for example an alkali metal hydroxide, e.g. sodium hydroxide, in water, at a temperature between 0° C. and 20° C., preferably between 0° C. and 4° C.

Compounds of general Formula XI may be prepared by the reaction of compounds of the general formula:

(R¹¹)₃P           (XII)

(wherein R¹¹ is as hereinbefore defined) with a compound of the general formula:

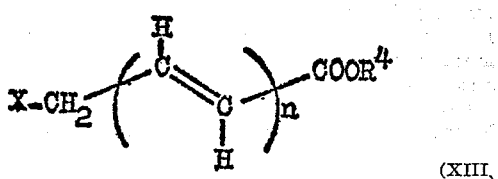

(XIII)

(wherein R⁴, n and X are as hereinbefore defined) in a dry inert organic solvent, for example an aromatic hydrocarbon e.g. benzene.

Compounds of general Formula XIII may be prepared by the methods described by Ziegler, Späth, Schaaf, Schumann and Winkelmann, Annalen, 551 (1942), 80, and Heilbron, Jones and O'Sullivan, J.C.S. (1946), 866.

Compounds of general Formula XI may be prepared by the reduction of compounds of the general formula:

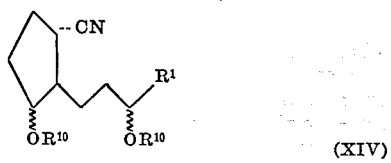

(XIV)

(wherein R¹ and R¹⁰ are as hereinbefore defined) by means of a known complex metal reducing agent, preferably a dialkylaluminium hydride (e.g. di-isobutylalumi- nium hydride), in a dry inert organic solvent, for example an aromatic hydrocarbon (e.g. benzene) or an ether (e.g. diethyl ether), at temperatures between —80° C. and +30° C.

Compounds of general Formula XIV may be prepared by the reaction of compounds of the general formula:

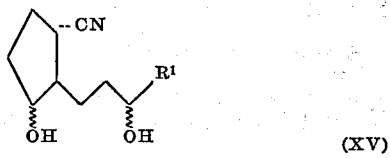

(XV)

(wherein R¹ is as hereinbefore defined) with two molar proportions of 2,3-dihydropyran or the appropriate alkylated 2,3-dihydropyran per molar proportion of compound of Formula XV in the presence of a catalytic amount of an acid, for example a mineral acid, e.g. concentrated hydrochloric acid. Reaction is preferably effected in the presence of an inert organic solvent, for example a halogenated hydrocarbon, e.g. dichloromethane, at laboratory temperature or with heating, for example to temperatures between 40° C. and 60° C.

Compounds of general Formula XV may be prepared by the simultaneous deacetylation and reduction of compounds of the general formula:

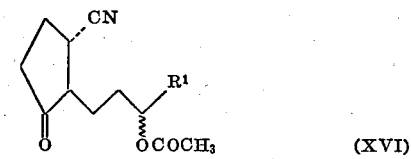

(XVI)

wherein R¹ is as hereinbefore defined. The reaction is preferably effected by treatment of compounds of Formula XVI with an alkali metal borohydride, for example sodium borohydride, in the presence of an aqueous alkali metal hydroxide, for example sodium hydroxide, and, if desired, an inert organic solvent, for example a lower alkanol, e.g. methanol, at an elevated temperature, preferably a temperature of 50 to 60° C.

Compounds of general Formula XVI may be prepared by the reaction of compounds of the general formula:

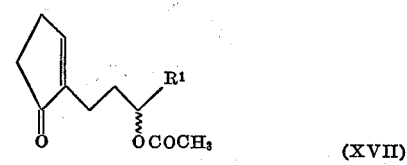

(XVII)

(wherein R¹ is as hereinbefore defined) with a source of hydrogen cyanide (e.g. acetone cyanohydrin) in the presence of a base, for example an alkali metal carbonate (e.g. sodium carbonate) in an inert aqueous organic solvent, for example an aqueous lower alkanol (e.g. aqueous methanol). The reaction is preferably effected at 50 to 100° C. and advantageously at the reflux temperature of the reaction mixture.

Compounds of general Formula XVII may be prepared by the reaction of compounds of the general formula:

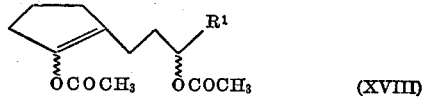

(XVIII)

(wherein R¹ is as hereinbefore defined) with a halogen, preferably bromine, in an inert organic solvent, for example a halogenated hydrocarbon (e.g. carbon tetrachloride), preferably at a temperature between 0° and —10° C., followed by treatment with a base, for example (a) a tertiary amine, e.g. triethylamine, preferably in the presence of an inert organic solvent, for example a halogenated hydrocarbon (e.g. carbon tetrachloride), and at an elevated temperature, advantageously at the reflux temperature of the reaction mixture, or (b) an aqueous inorganic base, for example an alkali metal carbonate, e.g. sodium carbonate, preferably at room temperature.

Compounds of general Formula XVIII may be prepared by the reaction of compounds of the general formula:

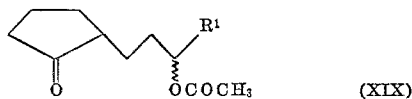
(XIX)

(wherein $R^1$ is as hereinbefore defined) with an acetylating agent, preferably a lower alkenyl acetate, for example isopropenyl acetate.

The reaction is preferably carried out in the presence of an organic acid, for example p-toluenesulphonic acid, using an excess of the lower alkenyl acetate as a solvent, at an elevated temperature so as to maintain continuous removal of the alkanone formed during the reaction.

Compounds of general Formula XIX may be prepared by aqueous acid hydrolysis of compounds of the general formula:

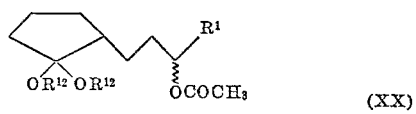
(XX)

wherein $R^1$ is as hereinbefore defined and the symbols $R^{12}$ represent identical alkyl groups, or together form an ethylene linkage unsubstituted or substituted by identical alkyl groups on each carbon atom. Preferably the groups $R^{12}$ form together an unsubstituted ethylene linkage. Hydrolysis is preferably effected with an aqueous organic acid, for example aqueous acetic acid, e.g. 80% aqueous acetic acid. Preferably the reaction is effected at laboratory temperature.

Compounds of general Formula XX may be prepared by the reaction of compounds of the general formula:

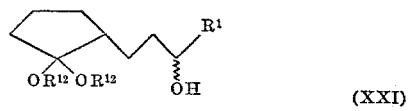
(XXI)

(wherein $R^1$ and $R^{12}$ are as hereinbefore defined) with an acetylating agent, for example acetic anhydride, preferably at an elevated temperature, e.g. at temperatures up to 100° C.

Compounds of general Formula XXI may be prepared by the reduction of compounds of the general formula:

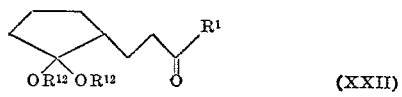
(XXII)

wherein $R^1$ and $R^{12}$ are as hereinbefore defined. Reduction is preferably effected by hydrogenation in the presence of a hydrogenation catalyst, e.g. Raney nickel, in the presence of an inert organic solvent, for example a lower alkanol, e.g. ethanol, preferably at elevated temperature and pressure, for example at 105° C. and a hydrogen pressure of 45 kilograms per square centimetre, or by treatment with a complex metal reducing agent, for example an alkali metal borohydride (e.g. sodium borohydride), in an aqueous organic solvent, for example an aqueous lower alkanol, e.g. ethanol, at temperatures between, for example, 0° C. and room temperature.

Compounds of general Formula XXII may be prepared by the reaction of compounds of the general formula:

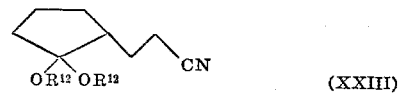
(XXIII)

(wherein $R^{12}$ is as hereinbefore defined) with a Grignard reagent represented by the general formula:

$$R^1MgX^1 \qquad (XXIV)$$

(wherein $R^1$ is as hereinbefore defined, and $X^1$ represents a halogen, preferably bromine, atom), or with a metal alkyl, wherein the alkyl moiety corresponds to the group $R^1$, for example an alkyl lithium, in an inert organic solvent, for example a lower dialkyl ether, e.g. diethyl ether. Reaction is preferably effected at an elevated temperature, for example, the reflux temperature of the reaction mixture.

Compounds of general Formula XXIII may be prepared by the application or adaptation of known methods, for example as described by T. Henshall and E. W. Parnell, J.C.S. (1962), 661.

Compounds of general Formula XXI may alternatively be prepared by the reaction of compounds of the general formula:

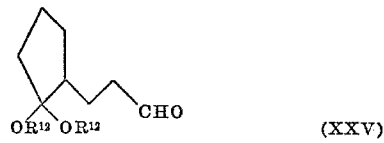
(XXV)

(wherein $R^{12}$ is as hereinbefore defined) with a Grignard reagent of Formula XXIV or a metal alkyl, wherein the alkyl moiety corresponds to the group $R^1$, for example an alkyl lithium, in an inert organic solvent, for example a lower dialkyl ether, e.g. diethyl ether. Reaction is preferably effected at an elevated temperature, for example the reflux temperature of the reaction mixture.

Compounds of general Formula XXV may be prepared by the reduction of compounds of Formula XXIII by means of a known complex metal reducing agent, preferably a dialkylaluminium hydride (e.g. di-isobutylaluminium hydride), in a dry inert organic solvent, for example an aromatic hydrocarbon (e.g. benzene) or an ether (e.g. diethyl ether) at temperatures between —80° C. and +30° C.

Compounds of general Formula I wherein A represents a group of Formula II, $R^2$ represents a group of Formula III and the symbols $R^3$ represent hydrogen atoms, may alternatively by prepared by the reduction of the double bonds of compounds of the general formula:

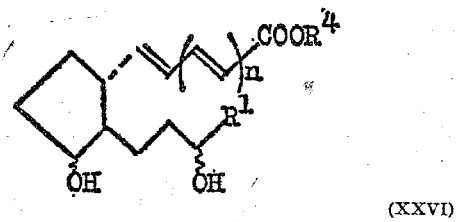
(XXVI)

wherein $R^1$, $R^4$ and $n$ are as hereinbefore defined. Reduction is preferably effected by hydrogenation in the presence of a hydrogenation catalyst, for example palladium on charcoal, in the presence of an inert organic solvent, for example a lower alkanol, e.g. ethanol, at laboratory temperature and elevated pressure, e.g. at a hydrogen pressure of 15 kilograms per square centimetre.

Compounds of general Formula XXVI may be prepared by the reaction of compounds of the general formula:

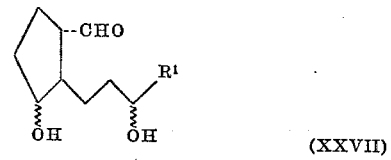
(XXVII)

(wherein $R^1$ is as hereinbefore defined) with compounds of Formula X, preferably under the same conditions as hereinbefore mentioned in respect of the reaction between compounds of Formulae IX and X.

Compounds of general Formula XXVII may be prepared by the reaction of compounds of Formula XVI with a known complex metal reducing agent suitable for the simultaneous reduction of the ketone and acetoxy groups to hydroxy groups, and the cyano group to a carbaldehyde group without affecting the rest of the molecule, preferably a dialkylaluminium hydride, for example di-isobutyl aluminium hydride, at temperatures between −80° C. and +30° C. Preferably the reaction is effected in the presence of a dry inert organic solvent, for example an ether (e.g. diethyl ether) or an aromatic hydrocarbon (e.g. benzene).

Compounds of general Formula I wherein A represents a carbonyl group, $R^2$ represents a hydroxy group and $R^3$ represents a hydrogen atom, are prepared (a) By the acid hydrolysis of compounds of the general formula:

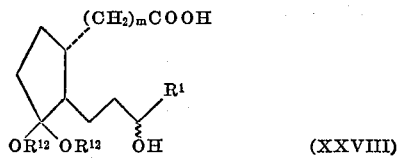

(XXVIII)

wherein $R^1$, $R^{12}$ and $m$ are as hereinbefore defined. Hydrolysis is preferably effected under mildly acidic conditions, for example at room temperature using an 80% aqueous acetic acid solution.

Compounds of general Formula XXVIII may be prepared by the alkaline hydrolysis of compounds of the general formula:

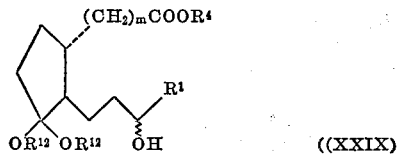

((XXIX)

wherein $R^1$, $R^4$, $R^{12}$ and $m$ are as hereinbefore defined. Hydrolysis is preferably effected by treatment with an alkali metal hydroxide, e.g. sodium hydroxide, in an aqueous-organic solvent, e.g. aqueous ethanol, if desired at an elevated temperature, e.g. the reflux temperature of the reaction mixture.

or (b) from compounds of Formula XXIX by the conversion of the groups $=C(OR^{12})_2$ and $—COOR^4$ to carbonyl and carboxy groups respectively in the reverse order, by acid hydrolysis followed by alkaline hydrolysis, under conditions like to those hereinbefore described for the said hydrolyses in process (a).

Compounds of general Formula XXIX may be prepared by the reduction of the double bonds of compounds of the general formula:

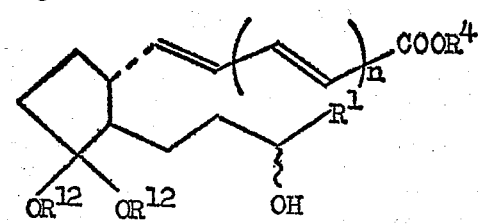

wherein $R^1$, $R^4$, $R^{12}$ and $n$ are as hereinbefore defined. Reduction is preferably effected by hydrogenation in the presence of a hydrogenation catalyst, for example palladium on charcoal, in the presence of an inert organic solvent, for example a lower alkanol, e.g. ethanol, at laboratory temperature and elevated pressure, e.g. at a hydrogen pressure of 15 kilograms per square centimetre.

Compounds of general Formula XXX may be prepared by the reaction of compounds of the general formula:

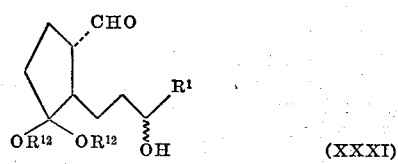

(XXXI)

(wherein $R^1$ and $R^{12}$ are as hereinbefore defined) with compounds of Formula X, preferably under the same conditions as hereinbefore mentioned in respect of the reaction between compounds of Formulae IX and X.

Compounds of general Formula XXXI may be prepared by the reduction of compounds of the general formula:

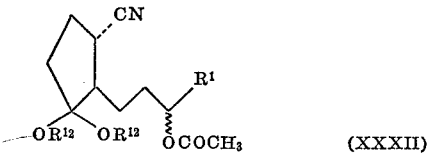

(XXXII)

(wherein $R^1$ and $R^{12}$ are as hereinbefore defined) by means of a complex metal reducing agent known for conversion of the acetoxy group to a hydroxy group and the cyano group to a carbaldehyde group, preferably a dialkylaluminum hydride (e.g. di-isobutylaluminium hydride), in an inert organic solvent, for example an aromatic hydrogen (e.g. benzene) or an ether (e.g. diethyl ether), at temperatures between −80° C. and +30° C.

Compounds of general Formula XXXII may be prepared from compounds of Formula XVI by known methods for the preparation of ketals from ketones, for example by the reaction of a compound of Formula XVI with the appropriate alcohol or diol with an acidic catalyst, for example p-toluenesulphonic acid, with continuous removal of water. Advantageously the reaction is effected in the presence of an inert organic solvent, for example an aromatic hydrocarbon (e.g. benzene), at an elevated temperature, such that the continuous removal of water is carried out by the use of a Dean and Stark apparatus.

Many compounds of general Formula I can also be prepared from other compounds of Formula I, as will be readily appreciated by those skilled in the art, for example:

Compounds of general Formula I, wherein $R^2$ represents a group of Formula III and $R^3$ represents an alkyl group, can be prepared by reaction of compounds of Formula I wherein $R^2$ represents a group of Formula III and $R^3$ represents a hydrogen atom with:

(a) Compounds of the general formula:

$$R^3Y \qquad (XXXIII)$$

(wherein $R_3$ represents an alkyl group, and Y represents the acid residue of a reactive ester, e.g. a bromine, chlorine or iodine atom or a sulphonate or sulphate group), optionally in the presence of an inert organic solvent, for example an aromatic hydrocarbon (e.g. benzene), in the presence of an alkali metal, an alkali metal hydride, for example sodium hydride, or a suitable metal oxide, preferably silver oxide, preferably at a temperature of 50–150° C.

(b) (Where $R^3$ may be represented by the formula —$CHR^{13}R^{14}$, wherein $R^{13}$ and $R^{14}$, which may be the same or different, represent hydrogen atoms or alkyl groups containing from 1 to 3 carbon atoms, such that the group $R^3$ contains a maximum of 4 carbon atoms) compounds of the general formula:

(XXXIV)

(wherein $R^{13}$ and $R^{14}$ are as hereinbefore defined), in the presence of a suitable Lewis acid, for example boron trifluoride, in an inert organic solvent, preferably a dialkyl ether (e.g. diethyl ether) at a temperature between −40° C. and +20° C., preferably between −40° C. and −10° C.

Compounds of general Formula I, wherein $R^2$ represents a hydroxy group or a group of Formula III and $R^3$ represents a group of Formula VI, can be prepared by the reaction of compounds of Formula I, wherein $R^2$ represents a hydroxy group or a group of Formula III, and $R^3$ represents a hydrogen atom, with compounds of the general formula:

$$(R^9CO)_2O \qquad (XXXV)$$

(wherein $R^9$ is as hereinbefore defined), preferably at ambient temperature and preferably in the presence of a base, for example, pyridine. The reaction may be effected in the presence of an inert organic solvent, for example an aromatic hydrocarbon (e.g. benzene).

Compounds of general Formula I, wherein $R^2$ represents a group of Formula IV or V and $R^3$ represents a hydrogen atom or an alkyl group, can be prepared by the reaction of compounds of Formula I, wherein $R^2$ represents a group of Formula III and $R^3$ represents a hydrogen atom or an alkyl group, with a compound of Formula XXXVI or XXXVII:

  

(wherein $R^5$, $R^6$, $R^7$ and $R^8$ are as hereinbefore defined), in an inert organic solvent, e.g. a lower alkanol (preferably ethanol), preferably at elevated temperatures, for example 50 to 120° C., and advantageously at the reflux temperature of the reaction mixture, optionally in the presence of a basic catalyst, for example an alkali metal alkoxide in a lower alkanol, e.g. sodium ethoxide in ethanol.

Alternatively, compounds of general Formula I wherein $R^2$ represents a group of Formula IV or V and $R^3$ represents an alkyl group can be prepared by the reaction of an acid halide of the general formula:

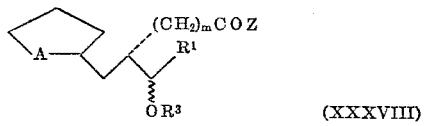

(wherein A, m and $R^1$ are as hereinbefore defined, $R^3$ represents an alkyl group and Z represents a halogen atom, preferably a chlorine atom) with a compound of Formula XXXVI or XXXVII, optionally in an inert organic solvent, for example a dialkyl ether (e.g. diethyl ether), preferably at ambient temperature.

Compounds of general Formula XXXVIII may be prepared from the parent acids by known methods for the preparation of acid halides, for example, where Z represents a chlorine atom, by the reaction with an excess of thionyl chloride optionally in an inert organic solvent (e.g. benzene) and preferably at ambient temperature.

Compounds of general Formula I wherein $R^2$ represents a group of Formula III and $R^3$ represents a hydrogen atom or an alkyl group can be prepared by the reaction of compounds of Formula I wherein $R^2$ represents a hydroxy group and $R^3$ represents a hydrogen atom or an alkyl group with:

(a) Compounds of the general formula:

$$R^4OH \qquad (XXXIX)$$

(wherein $R^4$ is as hereinbefore defined), an excess of which may be employed as solvent medium, in the presence of an aqueous inorganic acid, for example hydrochloric acid or sulphuric acid, preferably at temperatures between 50° C. and 110° C., and advantageously at the reflux temperature of the reaction mixture.

(b) [Where $R^4$ may be represented by the formula —$CHR^{13}R^{14}$ (wherein $R^{13}$ and $R^{14}$ are as hereinbefore defined)] compounds of Formula XXXIV, in an inert organic solvent, preferably a dialkyl ether (e.g. diethyl ether), preferably at ambient temperature.

(c) Silver oxide or other reagents known in the art for the production of silver salts of carboxylic acids, followed by reaction of the silver salts so formed with compounds of the general formula:

$$R^4Y \qquad (XL)$$

(wherein $R^4$ and Y are as hereinbefore defined), optionally in the presence of an inert organic solvent, for example, an aromatic hydrocarbon (e.g. benzene) at an elevated temperature and advantageously at the reflux temperature of the reaction mixture.

By the term "non-toxic salts," as used in the present specification, is meant salts the cations of which are relatively innocuous to the animal organisms when used in therapeutic doses so that the beneficial pharmacological properties of the parent acid compound of general Formula I are not vitiated by side-effects ascribable to those cations. Preferably the salts are water-soluble. Suitable salts include the alkali metal, e.g. sodium and potassium, and ammonium salts and pharmaceutically-acceptable (i.e. non-toxic) amine salts.

Amines suitable for forming such salts with carboxylic acids are well known and include, for example, amines derived in theory by the replacement of one or more of the hydrogen atoms of ammonia by groups, which may be the same or different when more than one hydrogen atom is replaced, selected from alkyl groups containing from 1 to 6 carbon atoms, hydroxyalkyl groups containing from 1 to 3 carbon atoms, cycloalkyl groups containing from 3 to 6 carbon atoms, phenyl groups, phenylalkyl groups containing from 7 to 11 carbon atoms and phenylalkyl groups containing from 7 to 15 carbon atoms wherein the alkyl moieties are substituted by hydroxy groups. The phenyl group and phenyl moieties of such phenylalkyl groups may be unsubstituted or substituted by one or two alkyl groups containing from 1 to 6 carbon atoms. Suitable amines also include those derived in theory by the replacement of two of the hydrogen atoms of ammonia by a hydrocarbon chain, which may be interrupted by nitrogen, oxygen or sulphur atoms, to form, together with the nitrogen atom of ammonia to which its terminal groups are attached, a five- or six-membered nitrogen-containing heterocyclic ring, which heterocyclic ring may be unsubstituted or substituted by one or two alkyl groups containing from 1 to 6 carbon atoms. Examples of suitable amine cations include mono-, di- and tri-methylammonium, mono-, di- and tri-ethylammonium, mono-, di- and tri-propylammonium, mono-, di- and tri-isopropylammonium, ethyldimethylammonium, mono-, di- and tri-2-hydroxyethylammonium, ethylbis(2 - hydroxyethyl)ammonium, butylmono(2-hydroxyethyl)ammonium, tris(hydroxymethyl)methylammonium, cyclohexylammonium, benzylammonium, benzyldimethylammonium, dibenzylammonium, phenyl-2-hydroxyethylammonium, piperidinium, morpholinium, pyrrolidinium, piperazinium, 1-methylpiperidinium, 4 - ethylmorpholinium, 1 - isopropylpyrrolidinium, 1,4-dimethylpiperazinium, 1 - butylpiperidinium, 2-methylpiperidinium and 1-ethyl - 2 - methylpiperidinium.

The non-toxic salts may be prepared from parent compounds of Formula I by known methods, for example by reaction of stoichiometric quantities of compounds of Formula I (wherein $R^2$ represents a hydroxy group) and the appropriate base, e.g. an alkali metal hydroxide or carbonate, ammonium hydroxide, ammonia or an amine, in a suitable solvent which is preferably water in the case of the preparation of alkali metal salts and water or isopropanol in the case of amine salts. The salts may be isolated by lyophilisation of the solution or, if sufficiently insoluble in the reaction medium, by filtration, if necessary after removal of part of the solvent.

By the term "known methods" as used in the present specification is meant methods heretofore used or described in the chemical literature.

Preferred compounds of general Formula I according to the present invention are those in which $R^1$ represents an n-pentyl group, m represents 6, $R^2$ represents a hydroxy group, a group of Formula III wherein $R^4$ represents a methyl or ethyl group, (i.e. a methoxy or ethoxy group), a group of Formula IV wherein $R^5$ represents a hydrogen atom and $R^6$ represents a methyl group (i.e. methylamino), or a group of Formula V wherein $R^7$ and $R^8$ both represent hydrogen atoms (i.e. hydrazino), and $R^3$ represents a hydrogen atom, a methyl group, or a group of Formula VI wherein $R^9$ represents a methyl group (i.e. acetyl) and, where $R^2$ represents a hydroxy group, non-toxic salts thereof. Especially preferred is the stereoisomer of 7-[3-hydroxy-2-(3-hydroxyoctyl)cyclopentyl]heptanoic acid where the relative configuration of the hydroxy group on the cyclopentane ring is thought to be trans to the 3-hydroxyoctyl side chain, which has the following spectroscopic properties:

$\nu_{max}$. 1700 cm.$^{-1}$ (liquid film), N.M.R.

(approximately 10% solution in deuterochloroform) 0.89$\delta$ (triplet J=4½ c./s., terminal CH$_3$), 1.38$\delta$ (singlet, chain CH$_2$) 1.4~2$\delta$ (multiplets), 2.32$\delta$ (triplet J=5½ c./s., CH$_2$CO), 3.5$\delta$ and 3.85$\delta$ (multiplets), 5.5$\delta$ (3H=OH and COOH): and mixtures of this compound with its "cis"-isomer.

The following examples illustrate the preparation of new compounds of the present invention.

EXAMPLE 1

(a) Preparation of 1,4-dioxa-6-(3-oxooctyl)spiro[4,4] nonane

A solution of 1,4-dioxa-6-(2-cyanoethyl)spiro[4,4] nonane [prepared by the method described by T. Hensall and E. W. Parnell, J.C.S. (1962), 661] (372 g.) in dry diethyl ether (1 litre) was added dropwise with stirring over 0.75 hour to pentyl magnesium bromide [1.5 equivalents, prepared by adding pentyl bromide (491 g.) in dry diethyl ether (750 ml.) to magnesium (90.6 g.) in dry diethyl ether (1.5 litres)]. The mixture was then refluxed for 2 hours and the cooled reaction mixture decomposed by careful addition of a saturated aqueous ammonium chloride solution, filtered, and the ether phase separated. The aqueous phase was extracted twice more with diethyl ether and the combined ether extracts dried over anhydrous magnesium sulphate. The diethyl ether was removed in vacuo and the residue distilled to give crude 1,4 - dioxa - 6-(3-oxooctyl)spiro[4,4]nonane, B.P. 110–145° C./0.1 mm. Hg. This was redistilled to give 1,4-dioxa-6-(3-oxooctyl)spiro[4,4]nonane (251 g.), B.P. 135–140° C./0.05–0.1 mm. Hg; $n_D^{22}$=1.462.

(b) Preparation of 1,4-dioxa-6-(3-hydroxyoctyl)spiro-[4,4]nonane 1,4 - dioxa - 6-(3-oxooctyl)spiro[4,4]nonane (250 g.) [prepared as described in (a) above] in ethanol (100 ml.) was catalytically hydrogenated using Raney nickel (37.5 g., hydrogen pressure 45 kg./cm.$^2$) at 105° C. for 8 hours. After removal of the catalyst by filtration and evaporation of the ethanol in vacuo, the residue gave 1,4 - dioxa - 6 - (3-hydroxyoctyl)spiro[4,4]nonane (230 g.), B.P. 120–130° C./0.1–0.05 mm. Hg; $n_D^{24}$=1.4715.

(c) Preparation of 1,4-dioxa-6-(3-acetoxyoctyl)spiro-[4,4]nonane 1,4-dioxa - 6 - (3-hydroxyoctyl)spiro[4,4]nonane, 229 g.) [prepared as described in (b) above] in acetic anhydride (1150 ml.) was heated at 100° C. for 2 hours. The excess acetic anhydride was removed in vauco and the residue distilled to give 1,4-dioxa-6-(3-acetoxyoctyl) spiro[4,4]nonane (245 g.), B.P. 140–145° C./0.05 mm. Hg; $n_D^{26}$=1.458.

(d) Preparation of 2-(3-acetoxoctyl)cyclopentanone 1,4 - dioxa - 6-(3-acetoxyoctyl)spiro[4,4]nonane (244 g.) [prepared as described in (c) above], glacial acetic acid (960 ml.) and water (240 ml.) were allowed to stand at room temperature for 3 days with occasional shaking. The mixture was diluted with water (6 l.), extracted with diethyl ether and the ether extracts washed with water, saturated aqueous sodium bicarbonate, water and saturated aqueous sodium chloride solution. After drying over anhydrous magnesium sulphate and evaporation of the ether in vacuo, the residue was distilled to give 2-(3-acetoxyoctyl)cyclopentanone (179 g.), B.P. 120–125° C./0.07 mm. Hg; $n_D^{26}$=1.456.

(e) Preparation of 1-acetoxy-2-(3-acetoxyoctyl) cyclopent-1-ene 2-(3-acetoxyoctyl)cyclopentanone (85 g.) [prepared as described in (d) above ], isopropenyl acetate (125 ml.) and p-toluenesulphonic acid (2 g.) were refluxed for 24 hours allowing the acetone formed during the reaction to slowly distil from the head of a Dufton column. The excess isopropenyl acetate was then distilled off and the residue cooled, shaken with 2 N sodium carbonate solution and extracted with diethyl ether. The combined ether extracts were dried over anhydrous magnesium sulphate and the ether removed in vacuo. Distillation of the residue gave 1-acetoxy-2-(3-acetoxyoctyl)cyclopent-1-ene (85 g.), B.P. 108–110 C./0.03 mm. Hg; $n_D^{26}$=1.459.

(f) Preparation of 2-(3-acetoxyoctyl)cyclopent-2-enone

To a stirred solution of 1-acetoxy-2-(3-acetoxyoctyl) cyclopent-1-ene (59.2 g.) [prepared as described in (e) above] in dry carbon tetrachloride (350 ml.) was added dropwise, during 30 minutes, a solution of bromine (32 g.) in dry carbon tetrachloride (100 ml.) at −10 to −5° C. The solution was stirred for a further 20 minutes without cooling. Triethylamine (22.2 g.) was then added and the resulting mixture stirred and refluxed for 90 minutes. The mixture was filtered, and the filtrate washed with aqueous 2 N sodium carbonate and with water. After drying over magnesium sulphate and evaproation of the solvent in vacuo, the residue was distilled, in the presence of a few crystals of potassium acetate, at 132–168° C./ 0.25 mm. Hg, to give crude 2-(3-acetoxyoctyl)cyclopent-2-enone. This was redistilled, with potassium acetate, at 116–135° C./0.15 mm. Hg to give 2-(3-acetoxyoctyl) cyclopent-2-enone (28.7 g.), $n_D^{28}$=1.470.

(g) Preparation of 2-(3-acetoxyoctyl)-3-cyanocyclopentanone 2-(3-acetoxyoctyl)cyclopent-2-enone (42.8 g.) [prepared as described in (f) above], acetone cyanohydrin (17.0 g.), aqueous sodium carbonate solution (6.6% w./v.; 18.3 ml.) and methanol (100 ml.) were stirred and refluxed for 4 hours. Methanol was removed in vacuo, water (100 ml.) added and the mixture extracted with ether and the ether extract dried with magnesium sulphate. The solvent was removed in vacuo and the residue distilled at 172–183° C./0.15 mm. Hg to give 2-(3 - acetoxyoctyl) - 3 - cyanocyclopentanone (22.0 g.), $n_D^{28.5}$=1.465.

(h) Preparation of 3-hydroxy-2-(3-hydroxyoctyl)cyclopentane carbonitrile

To a stirred solution of 2-(3-acetoxyoctyl)-3-cyanocyclopentanone (22 g.) [prepared as described in (g) above] in methanol (120 ml.) was added dropwise, during 15 minutes, a solution of sodium borohydride (9.2 g.) in 0.2 N aqueous sodium hydroxide solution (60 ml.) at 25–30° C. The solution was slowly heated to 50° C. and stirred at this temperature for 6 hours. Methanol was removed in vacuo, water (100 ml.) added and the mixture extracted with chloroform and dried with magnesium sulphate. The solvent was removed in vacuo and the residue distilled at 167–170° C./0.2 mm. Hg to give 3-hydroxy - 2 - (3-hydroxyoctyl)cyclopentane carbonitrile (15.3 g.), $n_D^{29}$=1.479.

(i) Preparation of 3-(2-tetrahydropyranyloxy)-2-[3-(2-tetrahydropyranyloxy)octyl]cyclopentane carbonitrile Dihydropyran (29.4 g.) was added dropwise at 40° C., with stirring, to 3-hydroxy-2-(3-hydroxyoctyl)cyclopentane carbonitrile (28.0 g.) [prepared as described in (h) above] and concentrated hydrochloric acid (6 drops) in dichloromethane (5 ml.). The temperature was allowed to rise to 55° C., maintained at this temperature for 90 minutes and then cooled. Diethyl ether (100 ml.) was added and the solution washed with aqueous 2 N sodium hydroxide and with water and dried over magnesium sulphate. The solvent was removed in vacuo to give crude 3-(2-tetrahydropyranyloxy) - 2 - [3-(2-tetrahydropyranyloxy)octyl]cyclopentane carbonitrile (48.5 g.) which was used as starting material in the following preparation (j) of 3-(2-tetrahydropyranyloxy)-2-[3-(2-tetrahydropyranyloxy)octyl]cyclopentane carbaldehyde without further purification.

(j) Preparation of 3-(2-tetrahydropyranyloxy)-2-[3-(2-tetrahydropyranyloxy)octyl]cyclopentane carbaldehyde To a vigorously stirred solution of crude 3-(2-tetrahydropyranyloxy) - 2-[3-(2-tetrahydropyranyloxy)octyl]cyclopentane carbonitrile (48.5 g.) [prepared as described in (i) above] in dry diethyl ether (225 ml.) was added a solution of di-isobutylaluminium hydride (22.7 g.) in dry benzene (90 ml.) at 3–7° C. The mixture was stirred at room temperature for 15 minutes and then added with stirring to 2 N aqueous acetic acid (225 ml.) at less than 15° C. The organic phase was separated, and the aqueous layer extracted with diethyl ether. The combined organic phases were washed with aqueous sodium bicarbonate and with water, dried with magnesium sulphate, and the solvents removed in vacuo. The residue was distilled, in the presence of a few crystals of potassium acetate, at 175–214° C./0.15 mm. Hg to give 3-(2-tetrahydropyranyloxy) - 2-[3-(2-tetrahydropyranyloxy)octyl]cyclopentane carbaldehyde (35.2 g.), $n_D^{29.5}=1.479$.

(k) Preparation of ethyl 7-{3-(2-tetrahydropyranyloxy)-2 - [3 - (2 - tetrahydropyranyloxy)octyl]cyclopentyl}-hepta-2,4,6-trienoate To a solution of 5-ethoxycarbonylpenta-2,4-dienyltriphenylphosphorane [prepared by adding N aqueous sodium hydroxide (50 ml.) to a stirred solution of 5-ethoxycarbonylpenta - 2,4 - dienyltriphenylphosphonium bromide (19.24 g.) in water (1250 ml.) at 1–3° C., extracting with chloroform and concentrating the extract to about 300 ml.] at 2° C., under nitrogen, was added 3-(2-tetrahydropyranyloxy - 2 - [3-(2-tetrahydropyranyloxy)-octyl]cyclopentane carbaldehyde (10.25 g.) [prepared as described in (j) above] in chloroform (25 ml.). The solution was allowed to stand at room temperature for 18 hours, the chloroform removed in vacuo and the residue extracted three times with hot petrol (B.P. 40–60° C.). The combined petrol extracts were cooled and filtered to remove precipitated triphenylphosphine oxide. The filtrate was evaporated in vacuo and the residue chromatographed on silica gel. Elution with petrol (B.P. 40–60° C.) gave ethyl 7-{3-(2-tetrahydropyranyloxy)-2-[3-(2-tetrahydropyranyloxy)octyl]cyclopentyl}hepta - 2,4,6-trienoate (8.5 g.), $\lambda_{max.}$ 306 mµ, ε 23,800 (ethanol); $\gamma_{max.}$ 1700 cm.$^{-1}$, 1610 cm.$^{-1}$ (liquid film).

5-ethoxycarbonylpenta - 2,4 - dienyltriphenylphosphonium bromide, used as a starting material was prepared as follows:

To a stirred solution of triphenylphosphine (34 g.) in dry benzene (300 ml.) was added ethyl 6-bromohexa-2,4-dienoate (30 g.). After 18 hours, the benzene was decanted from the precipitated paste which solidified on adding diethyl ether and was ground up and filtered to give 5 - ethoxycarbonylpenta-2,4-dienyltriphenylphosphonium bromide (40 g.), M.P. 139–144° C.

(l) Preparation of ethyl 7-{3-(2-tetrahydropyranyloxy)-2 - [3 - (2 - tetrahydropyranyloxy)octyl]cyclopentyl}-heptanoate Ethyl 7 - {3 - (2 - tetrahydropyranyloxy) - 2 - [3 - (2-tetrahydropyranyloxy)octyl]cyclopentyl}hepta - 2,4,6-trienoate (8.5 g.) [prepared as described in (k) above] was dissolved in ethanol (150 ml.) and catalytically hydrogenated using 5% palladium on charcoal with hydrogen pressure of 15 kg./cm.$^2$ at room temperature. The catalyst was filtered off and the ethanol removed in vacuo to give ethyl 7 - {3-(2-tetrahydropyranyloxy)-2-[3-(2-tetrahydropyranyloxy)octyl]cyclopentyl}heptanoate (7.2 g.), $n_D^{29}=1.473$, which was used as starting material in the following preparation (m) of ethyl 7-[3-hydroxy-2-(3-hydroxy)cyclopentyl]heptanoate without further purification.

(m) Preparation of ethyl 7-[3-hydroxy-2-(3-hydroxyoctyl)cyclopentyl]heptanoate

A mixture of ethyl 7-{3-(2-tetrahydropyranyloxy)-2-[3-(2 - tetrahydropyranyloxy)octyl]cyclopentyl}heptanoate (8.0 g.) [prepared as described in (1) above], ethanol (100 ml.), N HCl (200 ml.) and a cation-exchange resin [Dowex resin AG50W–X8 H$^+$] (15 g.) was stirred at 50–60° C. for 24 hours. The mixture was then cooled and filtered and the solid washed with diethyl ether and water. Combined filtrate and washings were evaporated in vacuo to remove organic solvents and the aqueous residue extracted with diethyl ether and dried over anhydrous sodium carbonate. The ether was removed in vacuo to give ethyl 7-[3-hydroxy - 2 - (3 - hydroxyoctyl)cyclopentyl]heptanoate (4.8 g.) which was used as starting material in the following preparation (n) of 7-[3-hydroxy-2 - (3 - hydroxyoctyl)cyclopentyl]heptanoic acid without further purification.

(n) Preparation of 7-[3-hydroxy-2-(3-hydroxyoctyl)cyclopentyl]heptanoic acid

Crude ethyl 7-[3-hydroxy - 2 - (3 - hydroxyoctyl)cyclopentylpentyl]heptanoate (4.8 g.), [prepared as described in (m) above], ethanol (50 ml.) and 2 N aqueous sodium hydroxide (50 ml.) were refluxed together for 18 hours. The ethanol was removed in vacuo, water (50 ml.) was added and the caustic residue extracted with diethyl ether. The aqueous phase was acidified to pH 1 by the dropwise addition of 2 N hydrochloric acid and was then extracted with diethyl ether, and the ether extract dried over magnesium sulphate. Evaporation of the ether in vacuo gave 7-[3-hydroxy-2-(3-hydroxyoctyl)cyclopentyl] heptanoic acid (3.4 g.) as a mixture of stereoisomers which were purified and partially separated by preparative thin-layer chromatography on silica gel (HF 254–366), using a 65:15:1 v./v. mixture of benzene, dioxan and acetic acid as eluent. Appropriate portions of the adsorbent were removed from the supporting glass plate and extracted with diethyl ether using a Soxhlet apparatus. Evaporation to dryness of the ether extract of the portion farther from the solvent front gave 7 - [3 - hydroxy-2 - (3 - hydroxyoctyl)cyclopentyl]heptanoic acid (1.4 g.) [steroisomer (a), thought to be the stereoisomer where the relative configuration of the hydroxy group on the ring is trans to the 3-hydroxyoctyl side chain] which had the following spectroscopic properties:

$v_{max.}$ 177 cm.$^{-1}$ (liquid film), N.M.R. (approximately 10% solution in deuterochloroform) 0.89 δ (triplet J=4½ c./s., terminal CH$_3$), 1.38δ (singlet, chain CH$_2$) 1.4~2δ (multiplets), 2.32δ (triplet J=5½ c./s., CH$_2$CO), 3.58 and 3.85δ (multiplets), 5.5δ (3H=OH and COOH). Evaporation to dryness of the ether extract of the portion nearer to the solvent front gave a mixture (b) (0.8 g.) containing both possible stereoisomers, cis and trans, which had an additional N.M.R. band at 4.2δ (multiplet).

EXAMPLE 2

(a) Preparation of 3-hydroxy-2-(3-hydroxyoctyl)cyclopentane carbaldehyde

To a vigorously stirred solution of 2-(3-acetoxyoctyl)-cyanocyclopentanone (2.8 g.) [prepared as described in Example 1(g) above] in dry diethyl ether (100 ml.) was added a solution of di-isobutyl-aluminium hydride (8.5 g.) in dry benzene (30 ml.) at 4–8° C. The mixture was stirred at room temperature for 15 minutes and then added with stirring to 2 N aqueous acetic acid (60 ml.) at 0.15° C. The organic phase was separated off, and the aqueous layer extracted with diethyl ether. The combined organic phases were washed with aqueous sodium bicarbonate and then with water, dried with magnesium sulphate, and the solvents removed in vacuo to give 3-hydroxy-2-(3 - hydroxyoctyl)cyclopentane carbaldehyde (2.3 g.).

*Elemental analysis.*—Found: C, 69.4%; H, 10.8%; $C_{14}H_{26}O_3$ requires C, 69.4%; H, 10.8%. $\nu_{max.}$ 1710 cm.$^{-1}$ (liquid film).

(b) Preparation of ethyl 7-[3-hydroxy-2-(3-hydroxyoctyl)cyclopentyl]hepta-2,4,6-trienoate To a solution of 5-ethoxycarbonylpenta-2,4-dienyltriphenylphosphorane [prepared as described in Example 1(k) above] in chloroform (300 ml.) at 3° C., under nitrogen, was added 3-hydroxy-2-(3-hydroxyoctyl)cyclopentane carbaldehyde (7.26 g.) [prepared as described in (a) above] in chloroform (25 ml.). The solution was allowed to stand at room temperature for 18 hours, the chloroform removed in vacuo and the residue chromatographed on silica gel. Elution with diethyl ether gave ethyl 7-[3-hydroxy - 2 - (3 - hydroxyoctyl)cyclopentyl]hepta-2,4,6-trienoate (6.5 g.), $\nu_{max.}$ 1710 cm.$^{-1}$, 1620 cm.$^{-1}$ (liquid film), which was used as starting material in the following preparation (c) of ethyl 7-[3 - hydroxy - 2 - (3-hydroxyoctyl)cyclopentyl]heptanoate without further purification.

(c) Preparation of ethyl 7-[3-hydroxy-2-(3-hydroxyoctyl)cyclopentyl]heptanoate

Ethyl 7-[3-hydroxy-2 - (3 - hydroxyoctyl)cyclopentyl]hepta-2,4,6-trienoate (4.0 g.) [prepared as described in (b) above] was dissolved in ethanol (100 ml.) and catalytically hydrogenated using 5% palladium on charcoal with a hydrogen pressure of 15 kg./cm.$^2$ at room temperature. The catalyst was filtered off and the ethanol removed from the filtrate in vacuo and the resulting residue chromatographed on silica gel. Elution with diethyl ether gave ethyl 7-[3-hydroxy-2-(3 - hydroxyoctyl)cyclopentyl]heptanoate (1.8 g.).

*Elemental analysis.*—Found: C, 70.9%; H, 11.1%; $C_{22}H_{42}O_4$ requires C, 71.3%; H, 11.4%. $\nu_{max.}$ 1720 cm.$^{-1}$ (liquid film).

EXAMPLE 3

(a) Preparation of 1,4-dioxa-6-(3-acetoxyoctyl)-7-cyanospiro[4,4]nonane

A mixture of 2-(3-acetoxyoctyl) - 3 - cyanocyclopentanone (27.9 g.) [prepared as described in Example 1(g) above], ethylene glycol (7.5 g.) and p-toluene sulphonic acid (1.0 g.) in benzene (300 ml.) was heated under reflux for 2½ hours, and the water liberated was continuously removed by means of a Dean and Stark head. An excess of sodium carbonate was added to the solution, which was shaken, and then filtered. The solvent was removed from the filtrate in vacuo and the resulting residue was distilled under reduced pressure, in the presence of a few crystals of potassium acetate, to give 1,4-dioxa-6-(3 - acetoxyoctyl) - 7 - cyanospiro[4,4]nonane (23.7 g.), B.P. 157–169° C./0.1 mm. Hg.

*Elemental analysis.*—Found: C, 67.2%; H, 9.1%; N, 3.9%; $C_{18}H_{29}NO_4$ requires C, 66.9%; H, 9.0%; N, 4.3%. $\nu_{max.}$ 2250 cm.$^{-1}$, 1730 cm.$^{-1}$, 1250 cm.$^{-1}$ (liquid film).

(b) Preparation of 1,4-dioxa-7-formyl-6-(3-hydroxyoctyl)spiro[4,4]nonane

To a vigorously stirred solution of 1,4-dioxa-6-(3-acetoxyoctyl)-7-cyanospiro[4,4]nonane (8.08 g.) [prepared as described in (a) above] in dry diethyl ether (100 ml.) was added a solution of di-isobutylaluminium hydride (14.2 g.) in dry benzene (50 ml.) at 4–11° C. The mixture was stirred at room temperature for 10 minutes and then added with stirring to 2 N aqueous acetic acid (100 ml.) at 0–20° C. The organic phase was separated off, and the aqueous layer extracted with diethyl ether. The combined organic phases were washed with an aqueous solution of sodium bicarbonate and then with water, dried with magnesium sulphate, and the solvents removed in vacuo to give 1,4-dioxa-7-formyl-6-(3-hydroxyoctyl)spiro[4,4]nonane (6.7 g.), $\nu_{max.}$ 1710 cm.$^{-1}$ (liquid film), which was used as starting material in the following preparation (c) of 1,4-dioxa-7-(6-ethoxycarbonylhexa-1,3,5-trienyl)-6-(3-hydroxyoctyl)spiro[4,4]nonane without further purification.

(c) Preparation of 1,4-dioxa-7-(6-ethoxycarbonylhexa-1,3,5-trienyl)-6-(3-hydroxyoctyl)spiro[4,4]nonane To a solution of 5-ethoxycarbonylpenta-2,4-dienyltriphenylphosphorane [prepared as described in Example 1(k) above] in chloroform (300 ml.) at 2° C., under nitrogen, was added 1,4-dioxa-7-formyl-6-(3-hydroxyoctyl)spiro[4,4]nonane (6.0 g.) [prepared as described in (b) above] in chloroform (25 ml.). The solution was allowed to stand at room temperature for 18 hours, the chloroform was removed in vacuo and the residue extracted twice with hot petroleum ether (B.P. 40–60° C.). The combined extracts were cooled and filtered, the filtrate was evaporated in vacuo and the resulting residue chromatographed on silica gel. Elution with diethyl ether gave 1,4 - dioxa - 7 - (6-ethoxycarbonylhexa-1,3,5-trienyl)-6-(3-hydroxyoctyl)spiro[4,4]nonane (4.8 g.), $\lambda_{max.}$ 305 m$\mu$, $\epsilon$ 34,200 (ethanol); $\nu_{max}$; 1700 cm.$^{-1}$, 1610 cm.$^{-1}$ (liquid film).

(d) Preparation of 1,4-dioxa-7-(6-ethoxycarbonylhexyl)-6-(3-hydroxyoctyl)spiro[4,4]nonane 1,4-dioxa-7-(6-ethoxycarbonylhexa-1,3,5 - trienyl) - 6-(3-hydroxyoctyl)spiro[4,4]nonane (4.8 g.) [prepared as described in (c) above] was dissolved in ethanol (100 ml.) and catalytically hydrogenated using 5% palladium charcoal with a hydrogen pressure of 15 kg./cm.$^2$ at room temperature. The catalyst was filtered off and the ethanol removed from the filtrate in vacuo to give impure 1,4-dioxa - 7 - (6 - ethoxycarbonylhexyl)-6-(3-hydroxyoctyl)spiro[4,4]nonane (4.4 g.), $\nu_{max.}$ 3450 cm.$^{-1}$, 1725 cm.$^{-1}$ (liquid film). This was used as starting material in the following preparation (e) of 1,4-dioxa-7-(6-carboxyhexyl)-6-(3-hydroxyoctyl)spiro[4,4]nonane without further purification.

(e) Preparation of 1,4-dioxa-7-(6-carboxyhexyl)-6-(3-hydroxyoctyl)spiro[4,4]nonane A mixture of 1,4-dioxa-7-(6-ethoxycarbonylhexyl)-6-(3-hydroxyoctyl)spiro[4,4]nonane (2.4 g.) [prepared as described in (d) above], ethanol (25 ml.) and 2 N aqueous sodium hydroxide solution (25 ml.) was heated to reflux for 16 hours. The ethanol was removed in vacuo, the mixture was treated with water (50 ml.) and then extracted with diethyl ether. The aqueous phase was acidified to pH 1 by the dropwise addition of concentrated hydrochloric acid and then extracted with diethyl ether. The ether extract was dried over magnesium sulphate. Evaporation of the ether in vacuo gave 1,4-dioxa-7 - (6-carboxyhexyl)-6-(3-hydroxyoctyl)spiro[4,4]nonane (1.5 g.).

*Elemental analysis.*—Found: C, 68.4%; H, 10.2%; $C_{22}H_{40}O_5$ requires C, 68.7%; H, 10.5% $\nu_{max.}$ 1705 cm.$^{-1}$, 1040 cm.$^{-1}$, 950 cm.$^{-1}$ (liquid film).

(f) Preparation of 7-[2-(3-hydroxyoctyl)-3-oxocyclopentyl]heptanoic acid 1,4-dioxa-7-(6 - carboxyhexyl) - 6 - (3 - hydroxyoctyl)spiro[4,4]nonane (1.4 g.) [prepared as described in (e) above] was dissolved in an 80% aqueous acetic acid solution (30 ml.) and left to stand at room temperature for three days. Water (150 ml.) was then added to the solution which was then extracted twice with diethyl ether. The combined ethereal extracts were washed three times with water, dried with magnesium sulphate and filtered. The filtrate was evaporated in vacuo at or below 55° C., the last traces of acetic acid being removed by the addition of small quantities of benzene to the residue and evaporating again in vacuo to give 7-[2-(3-hydroxyoctyl)-3-oxocyclopentyl]heptanoic acid (0.92 g.).

*Elemental analysis.*—Found: C, 70.6%; H, 10.3%; $C_{20}H_{36}O_4$ requires C, 70.5%; H, 10.7%. NMR (10% deuterochloroform solution): 0.90δ (triplet J=5 c./s., $CH_3$), 1.36δ (broad singlet, chain $CH_2$), 1.4–1.9δ (multiplets), 2.23δ and 2.35δ (two overlapping triplets J=6.5 c./s., $CH_2CO$ and CHCO), 3.60δ (multiplet), 6.8δ (OH, COOH).

EXAMPLE 4

Preparation of methyl 7-[3-hydroxy-2-(3-hydroxyoctyl) cyclopentyl]heptanoate (mixture of cis- and trans- isomers)

A solution of diazomethane (2.5 g.) in dry diethyl ether (100 ml.) was added to a solution of 7-[3-hydroxy-2-(3-hydroxyoctyl)cyclopentyl]heptanoic acid (3.4 g.) [mixture (b) of cis- and trans-isomers, prepared as described in Example 1(n)] in dry diethyl ether (25 ml.). The resulting solution was allowed to stand at ambient temperature for 18 hours, during which time a solid precipitated. The solid was removed by filtration and the filtrate evaporated in vacuo to gice methyl 7-[3-hydroxy-2-(3-hydroxyoctyl)cyclopentyl]heptanoate (3.1 g.), a mixture of the cis- and trans-isomers.

*Elemental analysis.*—Found: C, 70.4%; H, 11.0%; $C_{21}H_{40}O_4$ requires C, 70.7%; H, 11.3%. $\nu_{max}$. 1730 cm.$^{-1}$ (liquid film).

EXAMPLE 5

Preparation of methyl 7-[3-hydroxy-2-(3-hydroxyoctyl)-cyclopentyl]heptanoate ("trans-"isomer)

7-[3 - hydroxy - 2 - (3 - hydroxyoctyl)cyclopentyl]heptanoic acid (0.3 g.) [stereoisomer (a), prepared as described in Example 1(n)] was dissolved in dry diethyl ether (2.5 ml.) at ambient temperature and treated with a solution of diazomethane (0.32 g. in dry diethyl ether (10 ml.) and the resulting solution was allowed to stand at ambient temperature for 12 hours. The mixture was then filtered and the filtrate evaporated in vacuo to give methyl 7-[3-hydroxy - 2 - (3-hydroxyoctyl)cyclopentyl]-heptanoate (0.3 g.) (thought to be the stereoisomer where the relative configuration of the hydroxy group on the ring is trans to the 3-hydroxyoctyl side chain).

*Elemental analysis.*—Found: C, 70.6%; H, 11.3%; $C_{21}H_{40}O_4$ requires C, 70.7%; H, 11.3%. $\nu_{max}$. 1730 cm.$^{-1}$ (liquid film).

EXAMPLE 6

Preparation of 7-[3-acetoxy-2-(3-acetoxyoctyl)cyclopentyl]heptanoic acid

To a solution of 7-[3-hydroxy-2-(3-hydroxyoctyl)cyclopentyl]heptanoic acid (0.34 g.) [mixture (b) of cis- and trans-isomers, prepared as described in Example 1(n)] in dry pyridine (10 ml.) was added acetic anhydride (10 ml.). The resulting solution was allowed to stand at ambient temperature for 3 days, and then diluted with water while cooling externally with an ice bath. The resulting aqueous solution was extracted twice with diethyl ether and the combined extracts washed with dilute hydrochloric acid and water, then dried over magnesium sulphate. Evaporation in vacuo gave 7-[3-acetoxy-2-(3-acetoxyoctyl)cyclopentyl]heptanoic acid (0.36 g.).

*Elemental analysis.*—Found: C, 68.0%; H, 9.7%; $C_{24}H_{42}O_6$ requires C, 67.6%; H, 9.9%. $\nu_{max}$. 1725 cm.$^{-1}$, 1700 cm.$^{-1}$, 1245 cm.$^{-1}$ (liquid film).

EXAMPLE 7

Preparation of methyl 7-[3-methoxy-2-(3-methoxyoctyl)-cyclopentyl]heptanoate

A solution of methyl 7-[3-hydroxy-2-(3-hydroxyoctyl)-cyclopentyl]heptanoate (0.82 g.) [mixture of cis- and trans-isomers prepared as described in (Example 4)] in dry ether (15 ml.) was cooled to −40° C. and treated with boron trifluoride dimethyl etherate (0.5 ml.), immediately followed by a portion of freshly prepared dry diazomethane in diethyl ether, cooled to −40° C. Further diazomethane solution was then added until a yellow colour persisted. After standing at −40° C. for 15 minutes and at ambient temperature overnight, the mixture was filtered and the filtrate was washed with an aqueous sodium bicarbonate solution and water, dried over magnesium sulphate and evaporated in vacuo to give impure methyl 7-[3-methoxy-2-(3-methoxyoctyl)cyclopentyl]heptanoate (0.73 g.). This was purified by preparative thin-layer chromatography on silica gel (HF254–366) using a 65:15:1 v./v. mixture of benzene, dioxan and acetic acid as eluent. The appropriate portion of the absorbent was removed from the supporting glass plate and extracted with diethyl ether by means of a Soxhlet apparatus. Evaporation of the resulting ether extract gave methyl 7-[3-methoxy-2-(3-methoxyoctyl)cyclopentyl]heptanoate (0.18 g.).

*Elemental analysis.*—Found: C, 71.7%; H, 11.2%; $C_{23}H_{44}O_4$ requires C, 71.8%; H, 11.5%. $\nu_{max}$. 1730 cm.$^{-1}$, 1100 cm.$^{-1}$ (liquid film).

EXAMPLE 8

Preparation of N-methyl-7-[3-hydroxy-2-(3-hydroxyoctyl)cyclopentyl]heptanamide

To a solution of methyl 7-[3-hydroxy-2-(3-hydroxyoctyl)cyclopentyl]heptanoate (0.27 g.) (mixture of cis- and trans-isomers, prepared as described in Example 4) in ethanol (4 ml.) was added 33% methylamine in ethanol (1 ml.) followed by sodium ethoxide in ethanol [0.2 ml. of a solution prepared by dissolving sodium (0.1 g.) in ethanol (2 ml.)]. The resulting solution was heated to reflux for 9 hours and the ethanol removed in vacuo. The residue was diluted with ice-cooled water, extracted with benzene, and the extract washed with water and dried over magnesium sulphate and evaporated in vacuo. The resulting residue was washed with hot diethyl ether to give N-methyl-7-[3-hydroxy - 2 - (3-hydroxyoctyl)cyclopentyl]heptanamide (0.02 g.).

*Elemental analysis.*—Found: C, 71.5%; H, 11.3%; N, 3.4%; $C_{21}H_{41}NO_3$ requires C, 70.9%; H, 11.6%; N, 3.9%. $\nu_{max}$. 1650 cm.$^{-1}$, 1560 cm.$^{-1}$ (liquid film).

EXAMPLE 9

Preparation of 7-[3-hydroxy-2-(3-hydroxyoctyl)cyclopentyl]heptanohydrazide

A solution of methyl 7-[3-hydroxy - 2 - (3 - hydroxyoctyl)cyclopentyl]heptanoate (0.3 g.) (the stereoisomer thought to have the trans-configuration, prepared as described in Example 5) and 100% hydrazine hydrate (0.5 g.) in methanol (10 ml.) was refluxed for 30 hours. The methanol was removed in vacuo and the residue diluted with water, the resulting solution extracted twice with diethyl ether, and the combined ethereal extracts were dried over magnesium sulphate. Evaporation in vacuo gave a glassy solid which crystallised from diethyl ether to give 7-[3-hydroxy-2-(3-hydroxyoctyl)cyclopentyl]heptanohydrazide (0.15 g.) thought to be the stereoisomer where the relative configuration of the hydroxy group on the ring is trans to the 3-hydroxyoctyl side-chain), M.P. 81–83° C.

*Elemental analysis.*—Found: C, 67.5%; H, 11.3%; N, 7.7%; $C_{20}H_{40}O_3N_2$ requires C, 67.4%; H, 11.3%; N, 7.9%. $\nu_{max}$. 1640 cm.$^{-1}$, 1610 cm.$^{-1}$, 1535 cm.$^{-1}$ (KBr disc).

The present invention includes within its scope pharmaceutical compositions which comprise one or more compounds of general Formula I, or non-toxic salts thereof, together with a pharmaceutical carrier or coating. In clinical practice the compounds of the present invention will normally be administered orally, rectally or parenterally.

Solid compositions for oral administration include compressed tablets, pills, dispersible powders and granules. In such solid compositions one or more of the active compounds is, or are, admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening, flavouring, perfuming and preserving agents. The compositions according to the invention, for oral administration, also include capsules of absorbable material such as gelatin containing one or more of the active substances with or without the addition of diluents or excipients.

Solid compositions for rectal administration include suppositories formulated in known manner and containing one or more of the active compounds.

Preparations according to the invention for parenteral administration include sterile aqueous or nonaqueous, solutions, suspensions, or emulsions. Examples of non-aqueous solvents or suspending media are propylene glycol, polyethylene glycol, vegetable oils such as olive oils, and injectable organic esters such as ethyl oleate. These compositions may also contain adjuvants such as preserving, wetting, emulsifying and dispersing agents. They may be sterilised, for example, by filtration through a bacteria-retaining filter, by incorporation of sterilising agents in the compositions, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired shall be obtained. Obviously several unit dosage forms may be administered at about the same time. In general, the preparations should normally contain at least 0.025% by weight of active substance when required for administration by injection; for oral administration the preparations will normally contain at least 0.1% by weight of active substance.

In human therapy for the treatment of hypertension the compositions should generally be administered so as to give, in the case of intravenous infusion, between 0.3 and 9.0 mg. of active substance per kilogramme body weight per day, preferably in three periods per day.

In human therapy for the inhibition of gastric acid secretion the compositions should generally be administered so as to give, in the case of oral administration, between 2.0 and 40 mg. of active substance per kilogramme body weight per day in divided doses.

The following example illustrates pharmaceutical compositions according to the invention:

EXAMPLE 10

7 - [3 - hydroxy - 2-(3-hydroxyoctyl)cyclopentyl]heptanoic acid (300 mg., mixture of cis- and trans-isomers) was dissolved in ethanol (1 ml.) and the solution obtained was added to an aqueous solution of sodium carbonate (50 mg. in 12 ml.). Aqueous sodium chloride solution (2 ml., 0.9% w./v.) was then added to give a final volume of 15 ml. The solution was then sterilised by passage through a bacteria-retaining filter and placed in 1.5 ml. portions in 5 ml. ampoules, to give 3 mg. of the heptanoic acid derivative (in the form of its sodium salt) per ampoule. The contents of the ampoules were freeze-dried and the ampoules sealed. Dissolution of the contents of an ampoule in a suitable volume, e.g. 2 ml., of sterile water or physiological saline gave a solution ready for administration by injection.

We claim:

1. A cyclopentane derivative of the formula:

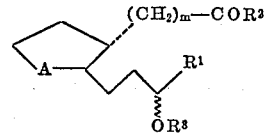

wherein A represents a carbonyl group or a group of the formula —CH(OR$^3$)—, R$^1$ represents alkyl of 1 through 5 carbon atoms, $m$ represents 4 or 6, R$^2$ represents

or, except when A represents a carbonyl group,

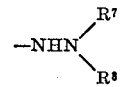

wherein R$^5$, R$^6$, R$^7$ and R$^8$ each represent hydrogen or alkyl of 1 through 4 carbon atoms, and R$^3$ represents hydrogen or alkyl or 1 through 4 carbon atoms, and when A represents the group —CH(OR$^3$)— the symbols R$^3$ both represent hydrogen atoms or identical alkyl groups.

2. Cyclopentane derivatives according to claim 1 in which R$^1$ represents n-pentyl, $m$ represents 6, R$^2$ represents methylamino or hydrazino, and R$^3$ represents hydrogen or methyl.

3. The cyclopentane derivative according to claim 1 which is N - methyl - 7-[3-hydroxy-2-(3-hydroxyoctyl)-cyclopentyl]heptanamide.

4. The cyclopentane derivative according to claim 1 whic is 7 - [3 - hydroxy-2-(3-hydroxyoctyl)cyclopentyl] heptanohydrazide.

References Cited

UNITED STATES PATENTS 3,501,525   3/1970   Lapidus et al. ------- 260—468

HARRY I. MOATZ, Primary Examiner

U.S. Cl. X.R.

260—247. 2 R, 268 R, 293.88, 326.3, 345.8, 345.9, 464, 468 D, 469, 486 R, 486 H, 488 R, 501.1, 501 M, 544 C, 514 R, 557, 586 R, 598; 424—248, 267, 250, 269, 298, 316, 317, 320